UNITED STATES PATENT OFFICE.

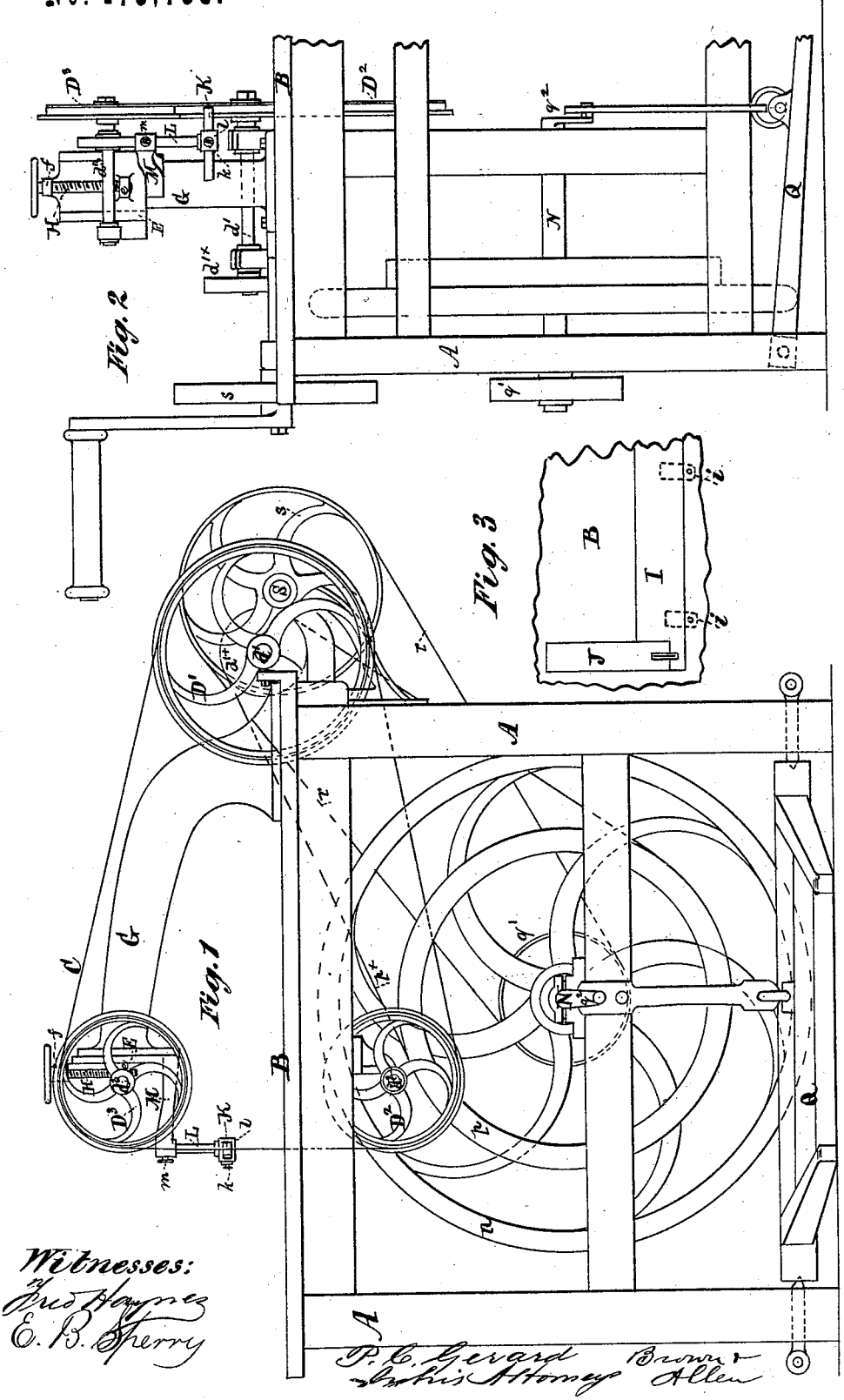

PAUL CLOVIS GÉRARD, OF PARIS, FRANCE.

IMPROVEMENT IN MACHINES FOR CUTTING CLOTH.

Specification forming part of Letters Patent No. 178,758, dated June 13, 1876; application filed April 11, 1876.

*To all whom it may concern:*

Be it known that I, PAUL CLOVIS GÉRARD, of Paris, in the Republic of France, have invented certain Improvements in Machines for Cutting Cloth and similar fabrics; and I do hereby declare that the following is a full, clear, and exact description of the same.

My invention relates to machines with endless-band cutters, and is intended more particularly for cutting several thicknesses of cloth at the same time in making a number of garments, or parts of garments, of uniform size; but is applicable to various other purposes.

In carrying out my invention I employ an endless cutting-blade, made of a strip of metal with its ends joined together, and this blade may have a sharp cutting-edge like a knife, or a toothed edge like a saw. The endless blade thus formed passes around three pulleys arranged triangularly with relation to each other, and one of said pulleys has its bearings in an adjustable frame, whereby provision is made for straining the blade to the proper tension. The blade is provided with two guides, one of which is arranged in or on the work table or bed, and the other is vertically adjustable in an arm or frame, and also serves as a presser-foot for the work. One of the guides serves to guide the blade in the direction of its width, and the other in the direction of its thickness.

The accompanying drawing illustrates the manner of carrying out my invention—

Figure 1 being a side view of a machine embodying my improvements, and Fig. 2 an end view of the same. Fig. 3 is a detail view.

The frame-work A, which supports the working parts, may be of any suitable construction, and its top forms a bed or work-table, B. The endless blade C passes around three pulleys, $D^1 D^2 D^3$, which are provided with flanges or rims for the purpose of preventing the displacement of the blade. The pulley $D^1$ is carried by a shaft, $d^1$, which has its bearings in stationary boxes arranged in the upper part of one end of the frame A. The pulley $D^2$ is carried by a shaft, $d^2$, arranged in bearings underneath the table B, near the middle thereof. The pulley $D^3$ is carried by a shaft, $d^3$, having its bearings in a frame, E, which is arranged to slide vertically on ways at the end of an arm, G, attached to the table B. Thus the three pulleys are arranged triangularly with relation to each other, the pulley $D^3$ being about over the pulley D. The frame E is provided with a nut or screw-threaded lug, $e$, and the arm G is provided with a perforated lug, $f$. A hand-screw, H, works in the lugs $e f$, and by turning said screw in one direction or the other the frame E, carrying the pulley-shaft $d^3$, is raised or lowered, and the endless blade C is thus strained to the proper tension.

The lower guide for the endless cutting-blade is formed by two removable plates or bars, I J, fitting in slots in the table B. The bar I is arranged parallel with the line of travel of the blade, and is provided with a notch parallel with the width of the blade, and when in place in the slot it rests upon buttons $i\,i$, pivoted to the under side of the table. Provision is made for placing the blade in position by removing the bar I, and turning the buttons so as to leave the slot clear. The plate or bar J is arranged at a right angle to the bar I, and is provided with a notch in line with the notch in the bar I, so that when the plates or bars I J are in place their two notches come together and form a slot, through which the blade C passes, and is thus guided in the direction of its thickness.

The upper guide consists of a block or short bar, K, fitting in a recess in a foot at the lower end of a rod, L, so that it may be adjusted in a horizontal direction to accommodate blades of different widths, and it is provided with a set-screw, $k$, for holding it steadily at different points of adjustment. The guide K is provided with a notch, through which the blade C passes, the back of the blade bearing against the bottom of the notch, and is thus guided in the direction of its width. The rod L is carried by an arm, M, which branches off from the arm G, passing through a hole in said arm provided with a set-screw, $m$, so that it may be raised or lowered in its seat, and held firmly at different heights. By this means the rod L is adjusted vertically to accommodate different layers or thicknesses of work, and the foot $l$ carried at the lower end serves as a presser-foot for holding the work closely down on the bed or table. The main driving-shaft N is provided with a fly-wheel, $n$, and carries a pulley, $p$, for transmitting motion to the shaft $d^1$, by means of a belt, $p^\times$, and a pulley, $d^{1\times}$. The main shaft N is also provided with a driving-pulley, $q$, at one end, and a crank, $q^2$, at the other end. A treadle, Q, may be connected by a link with the crank $q^2$, so as to enable the machine to be driven by foot-power. By means of the pulley $q^1$ the machine may be driven by a belt, by means of steam or other power.

When it is desired to drive the machine by hand-power, the treadle is disconnected, and a belt, $r$, (see Fig. 1,) is passed around the pulley $q^1$, and around a pulley, $s$, on a hand-crank shaft, S, arranged at a suitable portion of the frame. By this means provision is made for driving the machine by hand, foot, steam, or other power, at pleasure, or according to circumstances.

In some cases the machine may be simplified and cheapened by employing only two pulleys for the blade, one of which may be on the main shaft, and the blade may serve instead of a belt.

What I claim as new, and desire to secure by Letters Patent, is—

1. The combination, with the cutting-blade C, and bed or table B, of the lower guide, consisting of the removable notched plates or bars I J, substantially as shown and described.

2. The combination, with the cutting-blade C, of the upper guide K, adjustable horizontally and vertically, as herein shown and described.

3. The vertically-adjustable rod L and its foot I, in combination with arm M, whereby it serves as a carrier for the upper guide, and also as a presser-foot for the work, as herein shown and described.

PAUL CLOVIS GÉRARD.

Witnesses:
  A. LE BLANC PAGE,
  C. VESMOINS.